(12) United States Patent
Madawala et al.

(10) Patent No.: US 8,923,015 B2
(45) Date of Patent: Dec. 30, 2014

(54) PRIMARY-SIDE POWER CONTROL FOR INDUCTIVE POWER TRANSFER

(75) Inventors: Udaya Kumara Madawala, Manukau (NZ); Duleepa Jayanath Thrimawithana, Auckland (NZ)

(73) Assignee: Auckland UniServices Limited (NZ)

( * ) Notice: Subject to any disclaimer, the term of this patent is extended or adjusted under 35 U.S.C. 154(b) by 448 days.

(21) Appl. No.: 13/131,153
(22) PCT Filed: Nov. 26, 2009
(86) PCT No.: PCT/NZ2009/000263
§ 371 (c)(1),
(2), (4) Date: Jul. 11, 2011
(87) PCT Pub. No.: WO2010/062201
PCT Pub. Date: Jun. 3, 2010

(65) Prior Publication Data
US 2012/0002446 A1    Jan. 5, 2012

(30) Foreign Application Priority Data

Nov. 26, 2008 (NZ) .................................. 573241
Sep. 3, 2009 (NZ) .................................. 579498
Sep. 3, 2009 (NZ) .................................. 579499

(51) Int. Cl.
*H02M 3/335* (2006.01)
*H02J 17/00* (2006.01)
*H01F 38/14* (2006.01)
*B60L 11/18* (2006.01)
*H02J 7/02* (2006.01)
*H02J 5/00* (2006.01)

(52) U.S. Cl.
CPC .......... *H02M 3/33584* (2013.01); *Y02T 90/122* (2013.01); *H02J 7/025* (2013.01); *Y02T 10/7088* (2013.01); *Y02T 10/7005* (2013.01); *B60L 11/1842* (2013.01); *Y02T 90/127* (2013.01); *B60L 11/182* (2013.01); *Y04S 10/126* (2013.01); *Y02T 90/128* (2013.01); *H02J 5/005* (2013.01); *Y02T 90/14* (2013.01); *Y02T 90/16* (2013.01); *Y02T 90/163* (2013.01); *Y02E 60/721* (2013.01)
USPC ............................................ 363/17; 307/104

(58) Field of Classification Search
CPC .  H02M 3/3353; H02M 3/33569; H02J 7/025; H02J 5/005; H04B 5/0037; H04B 5/0075; H04B 5/0093; H01F 38/14
USPC ................... 363/15–17, 98; 307/17, 42, 104; 320/104, 108; 323/355; 336/115, 178, 336/180
See application file for complete search history.

(56) References Cited

U.S. PATENT DOCUMENTS 5,428,521 A    6/1995  Kigawa et al.
6,501,194 B1  12/2002  Jiang et al.
(Continued)

OTHER PUBLICATIONS

P. Si, P. A. Hu, J. W. Hsu, M. Chiang, Y. Wang, S. Malpas, and D.Budgett, "Wireless power supply for implantable biomedical device based on primary input voltage regulation," in Proc. 2nd IEEE Conf. Industrial Electronics and Applications, 2007, pp. 235-239.*
Y.-H. Chao, J.-J. Shieh, C.-T. Pan, W.-C. Shen, and M.-P. Chen, "A primary-side control strategy for series-parallel loosely coupled inductive power transfer systems," in Proc. 2nd ICIEA, May 23-25, 2007, pp. 2322-2327.*

(Continued)

*Primary Examiner* — Adolf Berhane
*Assistant Examiner* — Jye-June Lee
(74) *Attorney, Agent, or Firm* — Calfee, Halter & Griswold LLP (57) ABSTRACT

A method is provided for controlling the output voltage of a pickup in an inductive power transfer (IPT) system without any additional form of communications for feedback from the pickup to the power supply. The method comprising the steps of deriving an estimate of the output voltage of the pickup from the voltage across the primary conductive path, and adjusting the current in the primary conductive path so that the estimated pickup output voltage matches a required pickup output voltage. In particular, an estimate of the pickup output voltage is derived from the magnitude and phase angle of the voltage in the primary conductive path.

13 Claims, 5 Drawing Sheets

(56) References Cited

U.S. PATENT DOCUMENTS

| | | | |
|---|---|---|---|
| 6,934,167 B2 * | 8/2005 | Jang et al. | 363/21.02 |
| 7,307,390 B2 * | 12/2007 | Huynh et al. | 315/291 |
| 2007/0109708 A1 | 5/2007 | Hussman et al. | |
| 2007/0252441 A1 | 11/2007 | Yamauchi et al. | |
| 2008/0238364 A1 | 10/2008 | Weber et al. | |
| 2011/0231029 A1 | 9/2011 | Ichikawa et al. | |

OTHER PUBLICATIONS

R. Mecke and C. Rathge, "High frequency resonant inverter for contactless energy transmission over large air gap," in Proc. Rec. IEEE Power Electron. Spec. Conf., Jun. 2004, pp. 1737-1743.*

P. Si and A. P. Hu, "Analyses of dc inductance used in icpt power pick-ups for maximum power transfer," in Proc. IEEE/PES Transmission Distribution Conf. Exhibition 2005: Asia and Pacific, Aug. 2005, pp. 1-6.*

Liu, Wei et al., "Estimation of the Non-Measurable State Variables of a Transcutaneous Energy Transmission System for Artificial Human Implants Using Extended Kalman Filters," Circuits, Systems and Signal Processing, Aug. 2009, p. 581-593, vol. 28, No. 4.

International Search Report and Written Opinion from PCT/NZ2009/000263 dated Mar. 29, 2010.

International Preliminary Report on Patentability from PCT/NZ2009/000263 dated Jun. 9, 2011.

Office Action from U.S. Appl. No. 13/131,155 dated May 22, 2014.

Amendment from U.S. Appl. No. 13/131,155 dated Aug. 21, 2014.

* cited by examiner

PRIMARY-SIDE POWER CONTROL FOR INDUCTIVE POWER TRANSFER

FIELD

This invention relates to an apparatus and method for controlling power in an inductive power transfer system. More specifically, the invention enables the control or regulation of the output of a pickup from the primary side of the IPT system.

BACKGROUND

Inductive power transfer (IPT) or inductively coupled power transfer (ICPT) systems are well known and used for a number of industrial applications, and have particular advantages where traditional methods are unable to perform satisfactorily, for example clean rooms, people moving, materials handling, battery charging, or any application requiring a substantially contactless supply of power.

A typical IPT system consists of three main components; an AC power supply, a primary conductive path, and one or more electrically isolated pickups coupled with a load and provided substantially adjacent the primary conductive path. Together, the power supply and primary conductive path form the primary side of an inductive power transfer system, while the pickup and associated circuitry forms the secondary side.

The primary conductive path, typically in the form of an elongated conductive loop or track, is energised by the AC power supply to create a continuously varying magnetic field about the track. The or each pickup includes an inductive coil, in which a voltage is induced by the changing magnetic flux passing through the coil in accordance with Faraday's law of induction, thereby achieving contactless inductive power transfer.

Typically, the or each pickup will include some form of controller circuit to control the transfer of power to the load, including a switched-mode controller such as a boost converter, for example, to supply the relatively constant output voltage required by the load, thereby providing secondary-side output power control.

In some circumstances, it may be preferable to control the output power of the pickup from the primary side of the system. This may be due to the additional cost and complexity of the additional components required for a pickup side controller or due to limitations on the physical size of the pickup, for example. Power supplied to a load associated with a pickup may be controlled from the primary side of an IPT system by modulating the amplitude, phase or frequency of the current in the primary conductive path to reduce power at partial loads and minimise losses, or to increase the current in the primary conductive path and therefore the magnetic flux when the pickup coil is not ideally aligned, for example, to ensure the required power is supplied to the load. Providing primary-side power control can help reduce costs by eliminating the power conditioner and switched-mode controller from the pickup circuit.

However, although primary-side power control may be preferred in some circumstances, there are disadvantages in the primary-side power control methods of the prior art. For example, frequency modulation, wherein the frequency of the current in the primary conductive path is varied with respect to the resonant frequency of an inductively coupled pickup circuit to tune and/or detune the resonant circuit, is very difficult to achieve in practice and requires a complex power controller. A power controller which varies the current in the primary conductive path or track by amplitude modulation can be effective. However, in both cases, the system requires some form or wired or wireless communications to form a feedback loop between the pickup output on the secondary side of the system, and the power supply on the primary side. This adds to the complexity and cost of the system.

OBJECT OF THE INVENTION

It is therefore an object of the invention to provide a method, apparatus and/or system which enables effective pickup output power control from the primary side of an inductive power transfer (IPT) system, without the need for communications therebetween.

Alternatively, it is an object of the invention to at least provide the public with a useful choice.

Further objects of the invention will become apparent from the following description.

SUMMARY OF INVENTION

Accordingly in one aspect the invention may broadly be said to consist in a method of controlling the output voltage of a pickup in an inductive power transfer (IPT) system comprising the pickup, a power supply, and a primary conductive path, the method comprising the steps of:

deriving an estimate of the output voltage of the pickup from the voltage across the primary conductive path; and adjusting the current in the primary conductive path so that the estimated pickup output voltage matches a required pickup output voltage, by controlling the voltage supplied to the primary conductive path by the power supply.

Preferably the estimate of the output voltage takes into account changes in both an output load and a mutual coupling between the pickup and the primary conductive path.

Preferably the step of deriving an estimate of the output voltage of the pickup comprises determining the phase angle between the voltage and current in the primary conductive path, and using the phase angle to calculate the real component of the voltage across the primary conductive path.

Preferably the step of deriving an estimate of the output voltage of the pickup further comprises using the phase angle to calculate the imaginary component of the voltage across the primary conductive path, using the imaginary component to calculate the mutual inductive coupling between the pickup and the primary conductive path, and using the phase angle and mutual inductive coupling to derive an estimate of the output voltage of the pickup.

Preferably the step of adjusting the current in the primary conductive path comprises adjusting the current such that the estimated pickup output voltage matches the required output voltage. According to a second aspect, the invention may broadly be said to consist in a power controller adapted to perform the method according to any of the preceding statements.

According to a third aspect, the invention may broadly be said to consist in a power supply including the power controller of the second aspect.

According to a fourth aspect, the invention may broadly be said to consist in an IPT system including the power supply of the third aspect.

According to a fifth aspect, the invention may broadly be said to consist in a power supply for inductive coupling with a pickup via a conductive path in an inductive power transfer (IPT) system, the power supply comprising:

an inverter;

a resonant tank electrically coupled with the output of the inverter and comprising a tuning capacitor and the conductive path; and a power controller adapted to estimate the output voltage of a pickup inductively coupled with the power supply in use, by determining the phase angle between the voltage and current in the primary conductive path, calculating the real component of the voltage across the conductive path using the phase angle, deriving an estimate of the output voltage from the real component, and controlling the current supplied to the conductive path by varying the inverter output voltage such that the estimated output voltage matches a required pickup output voltage.

Preferably the power controller is further adapted to use the phase angle to calculate the imaginary component of the voltage across the primary conductive path, use the imaginary component to calculate the mutual inductive coupling between the pickup and the primary conductive path, and use the phase angle and mutual inductive coupling to derive an estimate of the output voltage of the pickup.

Preferably the inverter comprises two pairs of switches in an H-bridge configuration, wherein the power controller operates each pair of switches using symmetric square wave driving signals and is adapted to control the inverter output voltage by phase shifting one driving signal with respect to the other by an angle of between 180° and 360°.

Alternatively the inverter output voltage may be controlled using pulse-width modulation.

Alternatively the inverter output voltage may be controlled using a pre-regulator before the inverter. For example, a simple switched-mode DC/DC converter to regulate the inverter input voltage so that the inverter output voltage can be varied as desired.

According to a sixth aspect, the invention may broadly be said to consist in an inductive power transfer (IPT) system comprising a power supply according to the fifth aspect, a conductive path, and a pickup inductively coupled with the power supply via the conductive path.

Further aspects of the invention, which should be considered in all its novel aspects, will become apparent from the following description.

DRAWING DESCRIPTION

A number of embodiments of the invention will now be described by way of example with reference to the drawings in which.

DETAILED DESCRIPTION OF THE DRAWINGS

Figure 1:
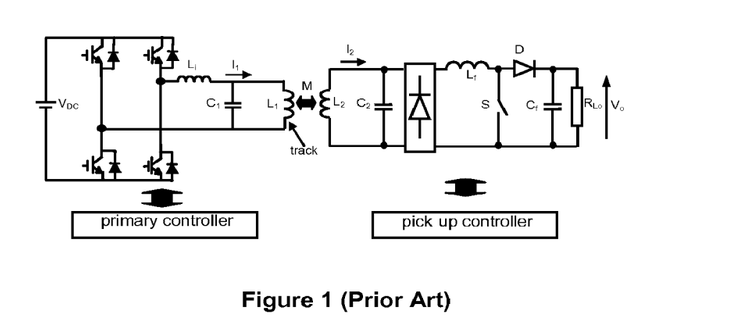
FIG. 1 is a schematic of an IPT system according to the prior art.

Design and control of typical IPT systems are well known and reported in literature. FIG. 1 shows a typical IPT system according to the prior art, with controllers employed on each side of an air-gap across which the power is transferred. The primary side controller generally operates the inverter to maintain a constant current in the primary winding, which is referred to as the track, compensating for any variations in input supply and pickup load ($R_L$). A resonant converter is generally used to generate the track current at the desired frequency, which ranges from 10-40 kHz in typical IPT systems. For IPT systems with multiple pickups, a constant track current is generally necessary but a varying track current may be employed for single pickup systems. A resonant circuit, tuned to the same track frequency, is usually employed in the pickup system to provide compensation for power factor improvement and maximum power delivery. The pickup side controller operates the pickup side circuit as a boost converter, using switch S, to regulate the amount of power extracted from the track through magnetic coupling, M, and transferred to the load. In this arrangement, the pickup behaves as a constant current source feeding the load. The amount of the current fed to the load is controlled by the duty cycle of the switch, which essentially decouples the load from the track when 'on', and is operated at a moderate frequency to lower switching losses.

A typical pickup that has a winding inductance $L_2$, which if not compensated (not tuned or does not contain a resonant circuit), can be represented by the following two equations:

$$V_{OC} = jM\omega I_1 \quad (1)$$

$$I_{SC} = \frac{M}{L_2}I_1$$

$V_{oc}$ and $I_{sc}$ are the open circuit voltage and short-circuit current, respectively, of a pickup which is magnetically coupled through a mutual inductance of M to a primary track that carries a current of $I_1$ at frequency $\omega$. As apparent from these two equations, the V-I characteristic of the pickup changes with the primary current $I_1$, if other parameters are kept constant. In other words, both the open circuit voltage and short circuit current in the pickup are directly proportional to the current $I_1$ in the primary conductive path.

If the pickup coil inductance $L_2$ is tuned to the track frequency with tuning capacitor $C_2$, such that $\omega^2 L_2 C_2 = 1$, then the impedance, $Z_2$, of the pickup seen by $V_{OC}$, and the current, $I_2$, in the pickup coil is given by $$Z_2 = j\omega L_2 + \frac{R_{ac}(1/j\omega C_2)}{R_{ac} + 1/j\omega C_2} = \frac{j\omega L_2}{1 + jQ_2} \quad (2)$$

$$I_2 = \frac{V_{oc}}{Z_2} = I_{sc}(1 + jQ_2) \quad (3)$$

Where the effective AC load before the rectifier $R_{ac}$, short-circuit current $I_{SC}$, and quality factor $Q_2$, of the pickup are defined by $$I_{sc} = \frac{M}{L_2} I_1 \quad (4)$$

$$Q_2 = \omega R_{ac} C_2 \quad (5)$$

$$R_{ac} = \frac{\pi^2}{8} R_L \quad (6)$$

The voltage across $C_2$ or the AC load voltage is then, $$V_{C2} = I_2 \frac{R_{ac}(1/j\omega C_2)}{R_{ac} + 1/j\omega C_2} = I_{sc} R_{ac} = Q_2 V_{oc} \quad (7)$$

Equation (7) suggests that the AC load voltage or the voltage across $V_{c2}$ is produced by a current source $I_{sc}$, which in fact is the Norton equivalent current of the pickup coil $L_2$. Therefore the pickup coil can be represented by its Norton equivalent circuit, and any pickup side analysis can simply be performed by treating the pickup essentially as a parallel resonant circuit—$L_2$ in parallel with $C_2$ and fed by the current source $I_{SC}$. Under this condition, the power delivered to the load by the pickup in FIG. 1, can be expressed by $$P_o = \frac{\pi}{2\sqrt{2}}(1-D) I_{sc} V_o = (0.9)(1-D) \frac{M}{L_2} I_1 V_o \quad (8)$$

where D is the duty cycle of the switch, S. Thus by simply controlling D, the power output of the pickup can be controlled. If necessary, equation (8) can easily be compensated for the diode drops of the rectifier bridge to obtain a more accurate estimate of the output power.

The present invention provides a method, apparatus and system for controlling the output of a pickup solely from the primary side of an IPT system, without any form of communications between the pickup and power supply. This is achieved by monitoring changes in the track voltage, which can be measured directly by the power supply on the primary (powering) side of the system.

Figure 2:
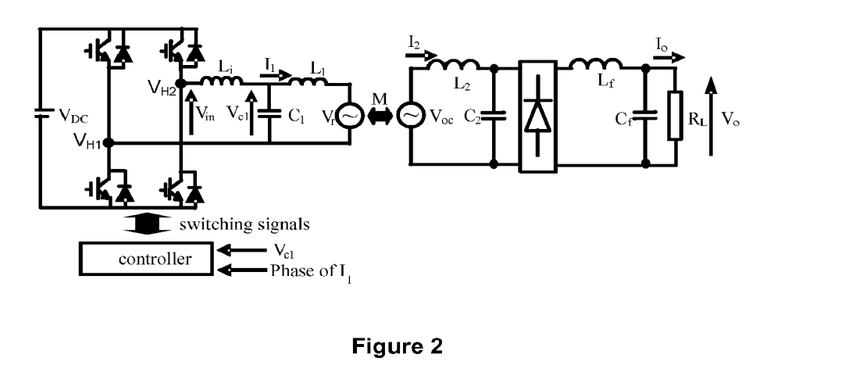
FIG. 2 is a schematic of an IPT system according to the preferred embodiment of the present invention.

Referring to FIG. 2, the load that each pickup supplies will typically fluctuate or vary, and this load change is reflected through the mutual inductive coupling M back to the power supply, which affects the voltage across the primary tank, $V_{c1}$. An estimate of the pickup output voltage $V_O$ may therefore be derived from the reflected voltage across the primary conductive path, $V_r$, or the resonant tank capacitor $V_{c1}$, which can be detected from the primary side of the system.

In particular, the real (as opposed to the imaginary) component of the resonant tank voltage $V_{c1}$ has been found to be proportional to, or at least indicative of, the pickup output voltage $V_O$, and therefore provides a way of estimating the output voltage to allow control thereof to account for changes in the load without any feedback from the secondary side of the system. This will be described in further detail herein below.

The present invention is therefore employed in the powering (or primary) side of the IPT system, and regulates or otherwise controls the output voltage of the pickup, controlling the power transfer from the primary side to the load associated with the pickup as effectively as that achieved in typical IPT systems with two controllers, or a single controller with secondary-side feedback. An inductive power transfer (IPT) system with a single controller without secondary side feed-back may lower the overall system cost, complexity and/or size, and may also improve the efficiency and reliability of the system compared to the prior art.

Embodiments of the invention will be described herein below by way of example with respect to regulating the output voltage of a pickup from the primary side of the IPT system, however it is to be appreciated that the same control technique can be adapted to regulate the output power or current. For example, in some applications such as battery or capacitor charging, a constant pickup output current or power may be preferable.

Referring still to FIG. 2, an example of a single pickup inductive power transfer (IPT) system according to the present invention is shown. In this embodiment, a power controller is provided only on the primary side of the system, coupled with the power supply. The IPT system comprises the power controller coupled with an inverter, which in turn is electrically coupled through the series inductor $L_i$ with a resonant tank comprising the primary conductive path or track $L_1$ and a tuning capacitor $C_1$.

The inverter is preferably adapted to generate an alternating current output at the frequency to which the primary resonant tank and the pickup are tuned. For a typical IPT system, that frequency will be in the range of 10-40 kHz. At such high frequencies, the output of the inverter may be a symmetric square wave voltage to minimise switching losses. This requires only a simple circuit to achieve, as shown in FIG. 1. Alternatively, the inverter may be modified for pulse width modulation (PWM) control to vary the amplitude of the output, or the inverter may provide a sinusoidal output voltage.

In the present example, regulation of the pickup output is achieved by varying the track current using amplitude modulation, although other techniques known in the art may alternatively be used without departing from the scope of the invention.

In the example IPT system 100 as illustrated, the inverter comprises four switches in a bridge configuration each shunted by diodes. The switches may be manipulated to produce a square-wave output, which is preferably symmetric with a 50% duty cycle and a substantially fixed frequency.

In the most preferred embodiment, however, the track current is controlled using a form of amplitude modulation wherein the duty cycle of the inverter output is varied by adjusting the pulse width of high and low levels in a three-level inverter (high being a positive voltage, low being a negative voltage, and the middle level being zero according to the preferred embodiment).

It is also intended that the invention may further comprise any other suitable DC-AC converter capable of allowing control of the track current. Although the power supply is depicted as being supplied by a DC power source, it should be appreciated that the power supply may alternatively include an AC to DC converter or rectifier, or an AC-AC converter, such that the system may alternatively be supplied by a single- or multi-phase AC power source such as that available from an outlet coupled to an electricity supply network or grid.

Together, the power controller, inverter, resonant tank, series inductor and primary conductive path may be referred to as the "primary side" of the IPT system.

In an IPT system of the present invention, the secondary side of the IPT system comprises a single pickup circuit. The pickup circuit is relatively simple as the output of the circuit may be controlled from the primary side. In the example embodiment shown in FIG. 1, the pickup circuit comprises a pickup coil $L_2$, a tuning capacitor $C_2$ forming a resonant circuit with the pickup coil, and additional circuitry to supply power to a load associated with the pickup such as a rectifier and filter where a DC output is required by the load $R_L$. The pickup coil is inductively coupled with the primary conductive path or track, as shown by the mutual inductance M, causing a current to be induced in the pickup coil as it intercepts the continuously varying magnetic field produced by an alternating current passing through the primary conductive path.

Although the inductive pickup circuit of FIG. 1 is depicted as being parallel tuned and having a DC output for the purposes of this example, the actual design of the pickup circuit will depend on the application of the IPT system and the requirements of the load associated with the circuit. For example, the pickup circuit may be series-tuned (i.e. the tuning capacitor $C_2$ provided in series with the pickup coil $L_2$), or may have an AC output. Such variations or modifications may be made to the system without departing from the scope of the present invention.

The power required by a load associated with the pickup generally fluctuates or varies with respect to time. In order to control or regulate the pickup output, it is therefore necessary to decrease the current through the track 102 when the load decreases to prevent damage to components, and increase the track current when the load increases to ensure that the required power is delivered by the pickup. The power controller 101 of the present invention provides a means for doing this, controlling the track current to match the required output power by altering the pickup V-I (voltage-current) characteristic.

The voltage, $V_r$, reflected in the track due to pickup current, $I_2$, can be expressed by $$V_r = -j\omega M I_2 \quad (9)$$

Substituting (3) and (4) in (9), and rearranging, the pickup impedance, $Z_r$, reflected on to the track can be given by $$Z_r = \frac{v_r}{I_1} = \frac{\omega M^2}{L_2}(Q_2 - j) \quad (10)$$

Therefore the impedance, $Z_1$, seen by the primary side inverter is $$Z_1 = j\omega L_i + \frac{(1/j\omega C_1)(j\omega L_1 + Z_r)}{(1/j\omega C_1 + j\omega L_1 + Z_r)} \quad (11)$$

If $L_i = L_1$ and $\omega L_1 C_1 = 1$, then (11) becomes $$Z_1 = \frac{(1/j\omega C_1)(j\omega L_1)}{(1/j\omega C_1 + j\omega L_1 + Z_r)} \quad (12)$$

Accordingly for a given driving voltage of $V_{in}$, the input current, $I_{in}$, and track current, $I_1$, can be expressed by $$I_{in} = V_{in}\frac{C_1}{L_1}\frac{\omega M^2}{L_2}(Q_2 - j) \quad (13)$$

$$I_1 = V_{in}\frac{1}{j\omega L_1} \quad (14)$$

Equation (14) implies that the track current, in this particular inductor-capacitor-inductor (LCL) resonant circuit configuration, is unaffected by the load for a given input voltage. As the track current may be considered as being constant, the output voltage, $V_o$, of the pickup is given by $$V_o = I_o R_L \quad (16)$$

Where DC load current, $I_O$, is defined by $$I_o = \frac{\pi}{2\sqrt{2}}|I_{sc}| \quad (17)$$

Substituting (17) in (16), $$V_o = \frac{\pi}{2\sqrt{2}}\frac{M}{L_2}I_1 R_L \quad (18)$$

Equation (18) implies that for a given pickup design and track current, the output voltage depends on the load impedance, and can be controlled by the track current, using the input voltage as given in (14), to compensate for any variations of the load impedance. Such control has traditionally required some form of 'wireless' feed-back of the output voltage or load impedance, which is cumbersome and expensive, requiring additional components and control. However, according to the present invention, control can be implemented without any wireless feed-back of the output voltage but only utilizing the track voltage itself as described below.

Using (14), the track voltage or the voltage, $V_{c1}$, across capacitor $C_1$ is given by $$V_{c1} = I_1\left[j\omega L_1 + \frac{\omega M^2}{L_2}(Q_2 - j)\right] \quad (19)$$

Manipulation of (19) using (4), (5), (6), (16) and (17) results in $$V_{c1} = \frac{\pi}{2\sqrt{2}}\frac{M}{L_2}V_0 + j\left(\omega L_1 - \frac{\omega M^2}{L_2}\right)I_1 \quad (20)$$

It is evident from equation (20) that, for a given magnetic coupling M as encountered in typical IPT applications, the real part of the track voltage, $\Re e{:}(V_{c1})$, depends solely on the output voltage $V_O$ (assuming a constant mutual inductance M) while the imaginary part is independent of the output voltage but depends on the track current $I_1$. If the output voltage changes because of a change in load impedance or input voltage, this change will manifest in the form of an increase or a decrease in the real part of the track voltage according to equation (20). Therefore any desired output voltage can be maintained by simply maintaining a predetermined constant value of $\Re e{:}(V_{c1})$, which corresponds to the desired $V_o$, through varying the input voltage by a controller on the primary side.

Figure 3:
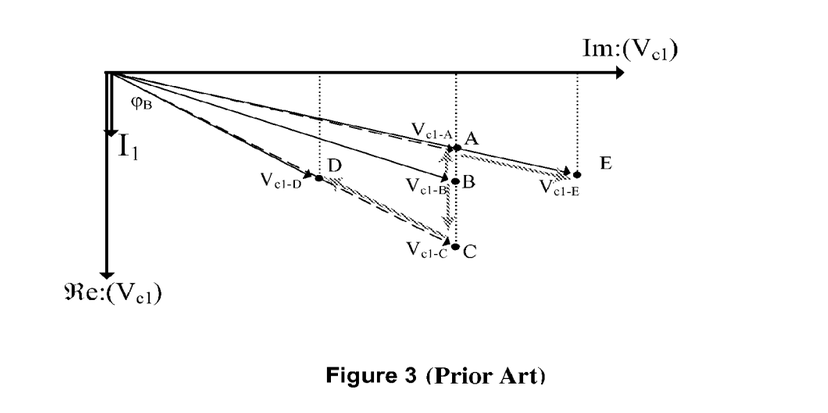
FIG. 3 is a phasor diagram illustrating the track voltage and current for the system of FIG. 1.

The relationship between the track current and the track voltage is illustrated in FIG. 3. As the track current is essentially constant, assume point B in FIG. 3 as the point of operation with phase angle between track voltage and current being $\phi_B$. In this condition, any increase or decrease in the load impedance will cause the operating point to move to C or A, respectively, decreasing or increasing the phase angle between track voltage and current. In accordance with (20), both the output voltage and, hence, the $\Re e{:}(V_{c1})$ will also increase or decrease, respectively, while the imaginary part of the track voltage remains constant. Therefore if the output voltage is to be restored to its previous value at point B, then it essentially requires a reduction in track current to force the operating point to settle at point D, where $\Re e{:}(V_{c1\text{-}D}){=}\Re e{:}(V_{c1\text{-}B})$ and $\text{Im}{:}(V_{c1\text{-}D}){<}\text{Im}{:}(V_{c1\text{-}B})$. Similarly, an increase in track current is required at point A to restore the output voltage to that at point B, and the operating point will settle at E, where $\Re e{:}(V_{c1\text{-}E}){=}\Re e{:}(V_{c1\text{-}B})$ and $\text{Im}{:}(V_{c1\text{-}B})$.

In applications of the invention in which variations in the magnetic coupling M may occur, those variations must be taken into account since they will influence $\Re e{:}(V_{c1})$, from which the estimate of the output voltage $V_O$ is derived. From equation (20) it can be seen that the imaginary part of $V_{c1}$, $\text{Im}{:}(V_{c1})$, is dependent on the coupling M but independent of the load (i.e. $V_O$). Thus any change in magnetic coupling should manifest as an increase or a decrease in $\text{Im}{:}(V_{c1})$, which can be estimated from the measured phase angle and track voltage for a given track current. Once the coupling, M, is estimated by a controller, it can be used together with $\Re e{:}(V_{c1})$ of (20) to estimate or predict $V_o$. A closed-loop controller can thus be implemented in such a way to generate an input voltage, which forces the predicted $V_o$ to be as same as the actual $V_o$, regardless of changes in the load or the magnetic coupling.

Figure 4:
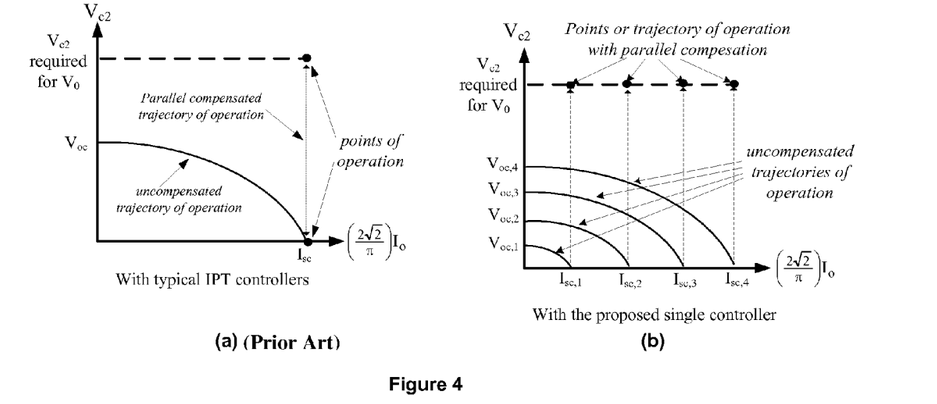
FIG. 4 shows the ideal voltage/current characteristics of IPT systems of both the prior art and the present invention.

It is obvious from both the above description and FIG. 3 that the proposed single controller regulates the output power by changing the track current, which is unique for each load. The required track current could be maintained by controlling the input voltage as per (14). The pickup characteristics under this control strategy for different load conditions are shown in FIG. 4. As evident from FIG. 4, the proposed controller forces the pickup to operate at a point, instead of forcing to follow a trajectory. As the load varies, the track current is also varied in such a manner that the pickup moves on to a new operating point with a different $Q_2$, which will maintain the required output voltage. Thus the pickup operates with a variable $Q_2$, which is high for light loads and low for high loads. In contrast, typical IPT systems always maintain a constant track current through a primary controller, and the amount of power delivered to the load is simply controlled by the pickup side controller. With essentially constant $I_{sc}$ due to constant track current, the duty cycle, D, of switch S in FIG. 1 effectively controls $Q_2$ to maintain the required output voltage. Even at very light loads, the track current is essentially maintained at constant, and thus the pickup operates at its maximum power point delivering only little or no power. It is apparent that such an operation is inefficient as the standing losses of the track and pickup losses would always remain the same irrespective of the power output. However, the proposed controller is more efficient in that respect as it maintains a track current which is just sufficient to transfer the required amount of power. In other words, it dynamically alters the pickup characteristics, as shown in FIG. 4, to suit or in accordance with the load demand.

Figure 5:
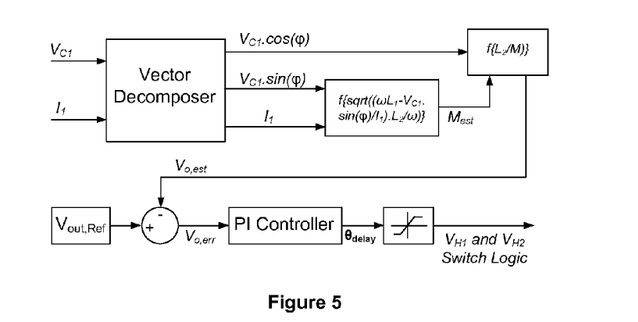
FIG. 5 is a block diagram of a controller according to the preferred embodiment of the present invention.

A control strategy according to the invention will be described below with reference to one possible example embodiment. A diagram of the controller 101 is shown in FIG. 5 and is simulated using The MathWorks, Inc.'s Simulink®. First, the time average of the phase difference $\phi$, between the track voltage and the track current is calculated. The cosine value of this phase angle is then calculated and multiplied by the RMS value of the track voltage to obtain $\Re e{:}(V_{c1})$. This is followed by the estimation of the output voltage by multiplying the calculated $\Re e{:}(V_{c1})$ with a constant, k, which is equivalent to $(2\sqrt{2}L_2)/(\pi M)$ and unique to the system (assuming a constant mutual coupling M).

The estimated output voltage, $(V_{o,est})$, is compared with a reference $(V_{o,ref})$, which represents the required output voltage, and the error is fed through a PI controller to derive a phase delay angle $(\theta_{delay})$ that can be used to control the inverter voltage, which in turn determines the track current in order to maintain the required output voltage. In the example inverter, the phase delay $\theta_{delay}$ is limited to between 0 and $\pi$, and is used to derive the drive signals for the two legs of the H-bridge inverter, which are ordinarily driven with a phase delay of $\pi$ radians or 180° to obtain the maximum output voltage (i.e. a square wave AC output having a 50% positive cycle and 50% negative cycle). The additional phase delay $\theta_{delay}$ forces one of the legs in the H-bridge inverter to be driven with an additional phase delay (in addition to the normal 180°) with respect to the other leg, thus creating a square wave voltage output with two voltage levels (positive and negative) plus an intermediate ground level equal to the $\theta_{delay}$ angle, to control the effective input voltage, $V_{in}$, supplied to the resonant tank to regulate the track current. The controller therefore controls the pulse width of the high (positive) and low (negative) outputs of the inverter by varying the proportion of time that the inverter output is grounded, thereby creating a stepped waveform. Although the pulse widths of the inverter are thus variable, the output frequency preferably remains substantially equal to that to which the resonant tank and pickup are each tuned.

Simulation of the IPT system shown in FIG. 2 with the controller of FIG. 5 was conducted using the parameters given in Table 1 below.

TABLE 1

|  |  | Value |
|---|---|---|
| Track and input inductance | $L_1$ | 13.7 μH |
| Pick-up inductance | $L_2$ | 28.6 μH |
| Mutual inductance | M | 8.2 μH |
| Input voltage | $V_{DC}$ | 20 V |
| Track frequency | ω | 20 kHz |
| Primary capacitance | $C_1$ | 4.5 μF |
| Pickup capacitance | $C_2$ | 2.2 uF |
| Output filter inductance | $L_f$ | 1 mH |
| Output filter capacitance | $C_f$ | 1000 uF |
| Output voltage | $V_0$ | 35 V |
| Maximum output power | $P_{0,\,max}$ | 150 W |

Figure 6:
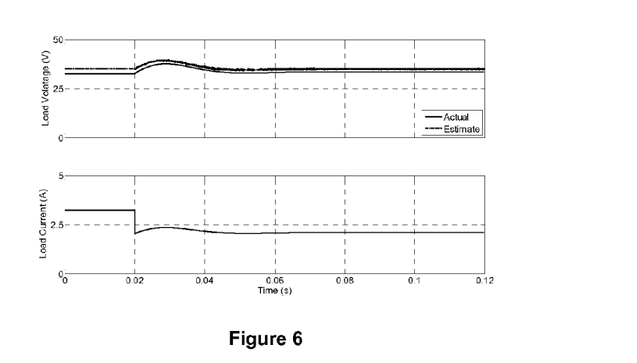
FIG. 6 is a graph showing the response of a pickup to a load transient.

FIG. 6 shows the response of output voltage and output current to a change in load at 20 ms. The primary converter has been delivering approximately 110 W at 35V to the pickside load, and at 20 ms the load has been switched to 70 W, which has caused the output current to decrease from about 3 A to 2 A. An instantaneous rise in output voltage can be observed but at about 120 ms the output voltage comes back to its original steady state value of approximately 35V. The initial rise in output voltage is caused by the slow response of the controller, which may be optimized. In practice, the settling time and the voltage transients can be minimized by increasing the gain of the controller and using a larger output capacitor. Also the slight error in steady state output voltage can be attributed to losses in the output stage, which has not been taken into account in this example voltage estimation algorithm.

The two legs of the H-bridge inverter are driven by square wave signals $V_{H1}$ and $V_{H2}$ each having a 50% duty cycle at the required frequency, separated by the phase delay $\theta_{delay}$ to produce a stepped square wave input $V_{in}$ to the resonant tank circuit. The phase delay $\theta_{delay}$ between $V_{H1}$ and $V_{H2}$ is determined by the PI controller and when the phase delay produced by the PI controller approaches 0, the phase shift between $V_{H1}$ and $V_{H2}$ approaches 180°. In other words, the phase delay $\theta_{delay}$ is added to a default delay of $\pi$ such that $V_{H2}$ always lags (or alternatively leads) $V_{H1}$ by an angle of between $\pi$ and $2\pi$.

Figure 7:
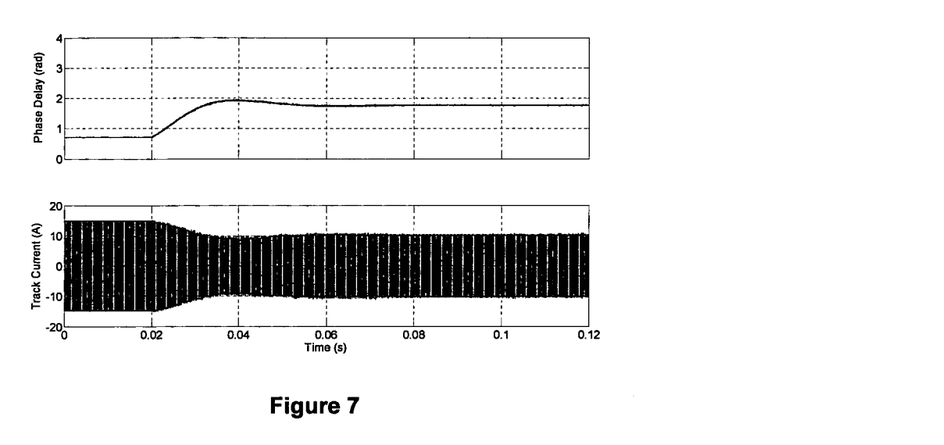
FIG. 7 is a graph showing the response of the track to a load transient.

FIG. 7 illustrates the delay $\theta_{delay}$ generated by the PID controller and the resulting track current profile for the same load transient shown in FIG. 6. As expected, when the load is reduced from 110 W to 70 W, the phase delay is increased to reduce the track current, through which the reduction in power demand can be met. The increased delay between $V_{H1}$ and $V_{H2}$ (i.e. $\pi+\theta_{delay}$) effectively produces a lower voltage $V_{in}$ (reducing the pulse width of the high and low level outputs of the inverter and increasing the period during which the inverter output is zero), which in turn lowers the track current from approximately 15 A to 10 A. As a consequence, the load current drops from about 3 A to 2 A to maintain the required output voltage of 35 V.

Figure 8:
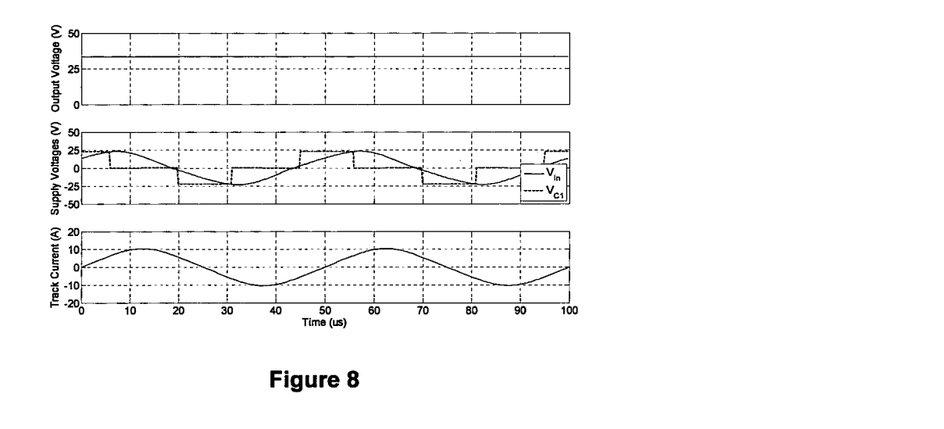
FIG. 8 is a graph showing the system voltages and currents of an example embodiment of the present invention under a light load.
Figure 9:
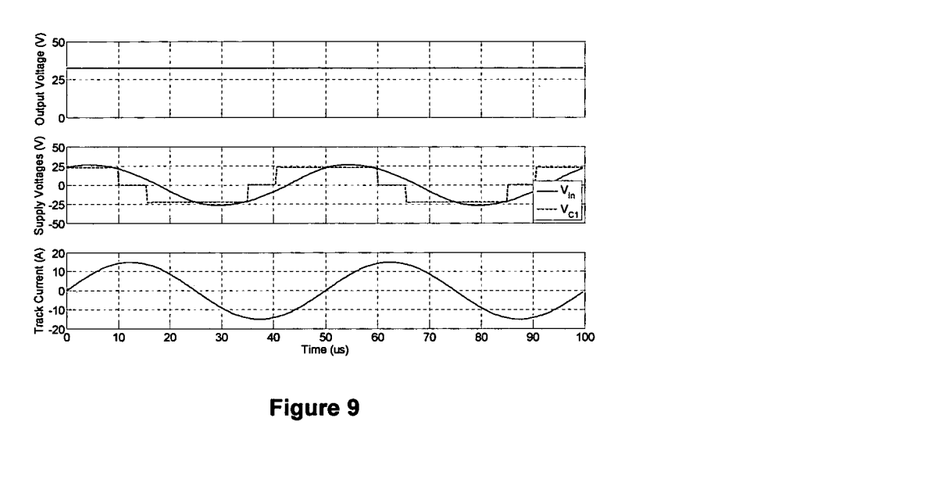
FIG. 9 is a graph showing the system voltages and currents of an example embodiment of the present invention under a heavy load.

The output of the inverter ($V_{in}$), track current ($I_1$), pickup voltage ($V_{st}$) and the output voltage ($V_o$) of the system for light (16Ω) and heavy (10Ω) loads are shown in FIG. 8 and FIG. 9, respectively. As the load is increased from 16Ω to 10Ω, the power drawn from the pickup unit increases, and to meet this increase in power demand the track current has to increase. This is achieved by reducing the phase delay $\theta_{delay}$ so that the delay between $V_{H1}$ and $V_{H2}$ tends towards the default delay of $\pi$, which causes $V_{in}$ to increase as evident from FIG. 8 and FIG. 9. The output voltage is kept constant at 35 V for both loads.

The example single controller IPT system of the present invention was experimentally tested on a 150 Watt laboratory prototype IPT system, again using the parameters given in Table 1, above. The primary side was energized by a 20V/10A H-bridge three-level inverter to generate a track current that was required for maintaining an output voltage of 35V, under varying load conditions. An open loop controller was used in the example for demonstration purposes. As the track was supplied by the inverter with square-wave voltage pulses of variable width, harmonics are expected to be present in the track current, affecting the accuracy of the analysis presented above which assumed sinusoidal excitation. However, it is evident from the harmonic analysis that the contribution of harmonic currents is small and hence can be ignored without compromising the accuracy. Even if the harmonics exist in the track, the consequent harmonics generated in the pickup will be filtered out by the low pass filter on the pickup side, and therefore have no impact on $\mathfrak{R}e:(V_{c1})$ of (20). This is further demonstrated by the experimental results presented below.

Table 2 shows the measured voltages, currents and phase angle, $\varphi$ of the prototype 150 Watt IPT system with a mutual coupling M of 8.2 uH, under varying load conditions but at constant input voltage of 20V. The estimated rms voltage across the pickup capacitance, $V_{c2,est}$, and the output voltage, $V_{0,est}$, are given in the last two columns of Table 2.

TABLE 2

| $V_{C1}(V)$ | $I_1(A)$ | $\varphi$ (deg) | Re: $\{V_{C1}\}$ (V) | $V_{C2}(V)$ | $V_0(V)$ | $P_0(W)$ | $R_L(\Omega)$ | $V_{C2, est.}$ | $V_{0, est}$ |
|---|---|---|---|---|---|---|---|---|---|
| 16.3 | 9.8 | 86.0 | 0.1 | 2.7 | 0.0 | 0.0 | 0 | 0.3 | 0.0 |
| 17.3 | 9.5 | 61.0 | 7.4 | 24.8 | 20.0 | 59.8 | 7 | 25.8 | 20.5 |
| 18.0 | 9.3 | 55.0 | 9.3 | 31.4 | 26.0 | 76.7 | 9 | 32.5 | 26.5 |
| 18.5 | 9.2 | 51.0 | 10.6 | 36.0 | 30.2 | 88.0 | 10 | 37.3 | 30.6 |
| 19.3 | 9.1 | 46.0 | 12.4 | 41.5 | 35.3 | 102.0 | 12 | 43.4 | 35.6 |
| 20.1 | 9.0 | 43.0 | 13.6 | 46.5 | 40.0 | 113.8 | 14 | 47.8 | 40.1 |
| 21.1 | 8.9 | 38.0 | 15.6 | 52.6 | 45.6 | 127.9 | 16 | 54.8 | 45.5 |
| 22.2 | 8.7 | 34.0 | 17.4 | 59.3 | 51.0 | 140.2 | 19 | 61.1 | 51.6 |

Figure 10:
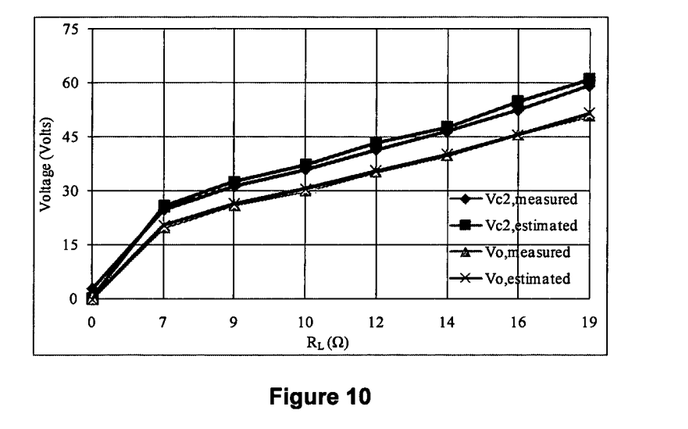
FIG. 10 is a graph showing the measured and estimated voltages of an example IPT system according to the present invention.

A phase angle of 90 degrees between track current and voltage is expected under 'ideal' short circuit conditions. However, this would not be the case in practice because of the standing losses of the track and, particularly, the pickup, and as such a phase angle of 86 degrees was measured at short circuit conditions. Since both the track current and short circuit current are constant for a given input voltage, this loss component was subtracted from $\mathfrak{R}e:(V_{c1})$ of (20) when estimating either $V_{c2}$ or $V_0$. Furthermore, the voltage drop across two conducting diodes of the rectifier bridge on the pickup side was also included to improve the accuracy of the estimation. Both (7) and (20) were used to estimate the voltages, as described above. FIG. 10 shows the comparison of the measured and estimated voltages in Table 2. As evident, the estimated or the predicted voltages are in excellent agreement with the measured voltages.

According to equation (14), the track current should remain constant for a given input voltage. This is true for ideal conditions, under which the resistive losses in the windings and deviations of component values can be neglected. However, as evident from the second column of Table 1, the track current is not constant at the constant voltage of 20V but decreases as the power output increases. At high power levels, $Q_2$ is high and, consequently, as per (13) the input current increases and, as such, the on state voltage drop across inverter switches and voltage drops across winding resistances of the primary side invariably increase, causing a reduction in track current. It is important to note that the reduction in track current has no impact on the accuracy of the predicted voltage values. This is because only the real power loss on the pickup side, which is reflected into the primary track, is required to accurately predict the voltages. Therefore the prediction or the estimation of pickup side voltages is indeed independent of the primary side losses, and can be regarded as a salient feature of the proposed single controller concept.

Figure 11:
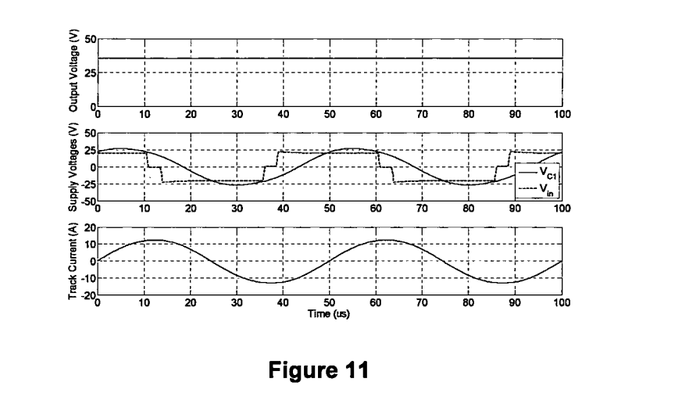
FIG. 11 is a graph showing the system voltages and currents of an example embodiment of an example embodiment of the present invention at a high load.
Figure 12:
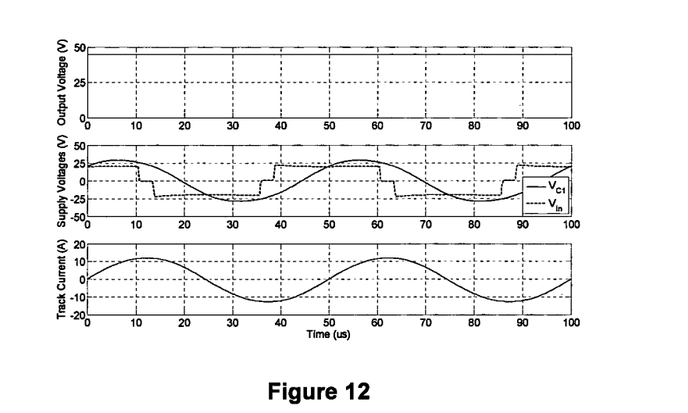
FIG. 12 is a graph showing the system voltages and currents of the example embodiment of the present invention at a light load.

FIG. 11 shows the measured output voltage, voltage generated by the inverter, track voltage and track current under steady state conditions for a high load. While the prototype was operating under this condition, the load impedance was increased. As described above, the pickup is essentially a current source, and thus the increase in load impedance resulted in a subsequent increase in output voltage and output power, owing to the load being supplied by a constant current source. This is clearly evident from FIG. 12, which shows an increase in output voltage, and more importantly a reduction in phase angle between track voltage and current in accordance with FIG. 3. The track current remains approximately constant as the voltage generated by the inverter was unaltered.

Figure 13:
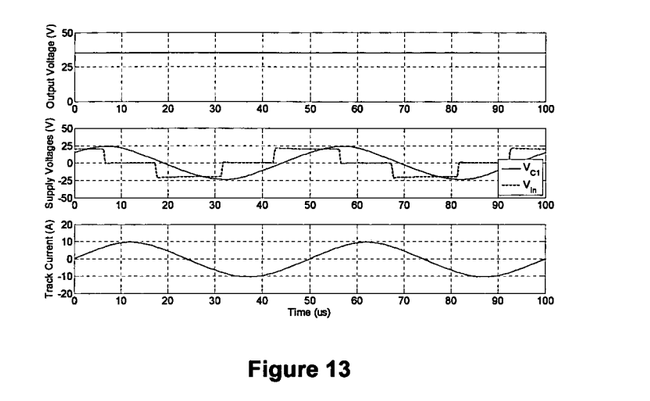
FIG. 13 is a graph showing the system voltages and currents of the example embodiment of the present invention at a light load with a restored output voltage.

As explained above, restoration of output voltage to its original value requires a reduction in track current. This was achieved by lowering the voltage generated by the inverter. The measured waveforms of the prototype at lower input voltage are shown in FIG. 13, which clearly confirms that the output voltage is restored and the track current is reduced.

Those skilled in the art will appreciate the present invention may be said to consist in a method of controlling power in an IPT system using only a single power controller on the primary/powering side of the system, a power controller performing the aforementioned method, an IPT power supply comprising at least the power controller, and/or an IPT system comprising at least the IPT power supply of the present invention.

While the invention has been described with reference to the preferred embodiment in which the IPT system comprises a single pickup with no secondary-side power controller, the primary-side power controller of the present invention may be used in certain circumstances in systems having multiple pickups inductively coupled with a single power supply and/or including secondary-side controllers without departing from the scope of the invention.

From the foregoing it will be seen that a new primary side control technique for IPT systems is provided. The proposed method, which requires only a single controller located on the powering side to effectively control the output voltage of receiving side, is simple and cost effective in comparison to existing techniques. The proposed single controller is suitable for IPT systems with approximately constant magnetic coupling but can easily be modified to applications with variable coupling. IPT systems with the proposed controller may offer the advantages of being efficient, reliable and low in cost while offering the same or a similar level of controllability as IPT control systems of the prior art.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A method of controlling an output voltage of a pickup in an inductive power transfer (IPT) system comprising the pickup, a power supply, and a primary conductive path with an unknown or variable mutual coupling between the pickup and the primary conductive path, the method comprising steps of:
    deriving an estimate of the unknown or variable mutual coupling between the primary conductive path and the pickup from a voltage across the primary conductive path;
    deriving an estimate of the output voltage of the pickup based at least in part on the voltage across the primary conductive path and the estimated unknown or variable mutual coupling; and
    adjusting a current in the primary conductive path so that the estimated pickup output voltage matches a required pickup output voltage, by controlling a voltage supplied to the primary conductive path by the power supply.

2. The method of claim 1 wherein the estimate of the output voltage of the pickup takes into account changes in both an output load and the unknown or variable mutual coupling between the pickup and the primary conductive path.

3. The method of claim 1 wherein the steps of deriving the estimate of the output voltage of the pickup comprises at least determining a phase angle between the voltage across and the current in the primary conductive path, using the phase angle to calculate a real component of the voltage across the primary conductive path, and deriving the estimate of the output voltage of the pickup from the real component of the voltage across the primary conductive path.

4. The method of claim 3 wherein the steps of deriving the estimate of the output voltage of the pickup further comprises using the phase angle to calculate an imaginary component of the voltage across the primary conductive path, using the imaginary component to estimate the unknown or variable mutual coupling between the pickup and the primary conductive path, and using the phase angle and unknown or variable mutual coupling to derive the estimate of the output voltage of the pickup.

5. A power supply comprising an inverter, a resonant tank electrically coupled with an output of the inverter, and a power controller adapted to control operation of the inverter to control an output voltage of a pickup inductively coupled with the power supply, wherein the power controller is adapted to:
    derive an estimate of an unknown or variable mutual coupling between a primary conductive path and the pickup from a voltage across the primary conductive path;
    derive an estimate of the output voltage of the pickup based at least in part on the voltage across the primary conductive path and the estimated unknown or variable mutual coupling; and
    adjust a current in the primary conductive path so that the estimated pickup output voltage matches a required pickup output voltage, by controlling a voltage supplied to the primary conductive path by the power supply.

6. An inductive power transfer (IPT) system comprising a power supply and a pickup for inductive coupling with the power supply, wherein the power supply comprises an inverter, a resonant tank electrically coupled with an output of the inverter, and a power controller adapted to control operation of the inverter to control an output voltage of the pickup inductively coupled with the power supply wherein the power controller is adapted to:

derive an estimate of an unknown or variable mutual coupling between a primary conductive path and the pickup from a voltage across the primary conductive path;

derive an estimate of the output voltage of the pickup based at least in part on the voltage across the primary conductive path and the estimated unknown or variable mutual coupling; and adjust a current in the primary conductive path so that the estimated pickup output voltage matches a required pickup output voltage, by controlling a voltage supplied to the primary conductive path by the power supply.

7. A power supply for inductive coupling with a pickup via a primary conductive path in an inductive power transfer (IPT) system with an unknown or variable mutual coupling between the pickup and the primary conductive path, the power supply comprising:

an inverter;

a resonant tank electrically coupled with an output of the inverter and comprising a tuning capacitor and the primary conductive path; and a power controller adapted to derive from a voltage across the primary conductive path an estimate of the unknown or variable mutual coupling between the primary conductive path and the pickup inductively coupled with the power supply in use, and derive an estimate of an output voltage of the pickup based at least in part on the estimated unknown or variable mutual coupling and the voltage across the primary conductive path.

8. The power supply of claim 7, wherein the power controller is further adapted to derive the estimate of the output voltage of the pickup by determining a phase angle between the voltage across and a current in the primary conductive path, calculating a real component of the voltage across the primary conductive path using the phase angle, deriving the estimate of the output voltage of the pickup from the real component, and controlling the current supplied to the primary conductive path by varying an inverter output voltage such that the estimated pickup output voltage matches a required pickup output voltage.

9. The power supply of claim 8, wherein the power controller is adapted to use the phase angle to calculate an imaginary component of the voltage across the primary conductive path, use the imaginary component to estimate the unknown or variable mutual coupling between the pickup and the primary conductive path, and use the phase angle and unknown or variable mutual coupling to derive the estimate of the output voltage of the pickup.

10. The power supply of claim 7, wherein the inverter comprises two pairs of switches in an H-bridge configuration, and the power controller operates each pair of switches using symmetric square wave driving signals and is adapted to control an inverter output voltage by phase shifting one driving signal with respect to another by an angle of between 180° and 360°.

11. The power supply of claim 7, wherein an inverter output voltage is controlled using pulse-width modulation.

12. The power supply of claim 7, wherein an inverter output voltage is controlled using a pre-regulator.

13. An inductive power transfer (IPT) system comprising the power supply according to claim 7, the primary conductive path, and the pickup inductively coupled with the power supply via the primary conductive path.

* * * * *